US 8,552,881 B2

(12) United States Patent
Nylund

(10) Patent No.: US 8,552,881 B2
(45) Date of Patent: Oct. 8, 2013

(54) ELECTRONIC DEVICE WITH A SITUATIONAL AWARENESS FUNCTION

(75) Inventor: Blake J. Nylund, Lynchburg, VA (US)

(73) Assignee: Harris Corporation, Melbourne, FL (US)

(*) Notice: Subject to any disclaimer, the term of this patent is extended or adjusted under 35 U.S.C. 154(b) by 350 days.

(21) Appl. No.: 13/023,753

(22) Filed: Feb. 9, 2011

(65) Prior Publication Data

US 2012/0200419 A1     Aug. 9, 2012

(51) Int. Cl.
*G08B 21/00* (2006.01)
*G08B 1/08* (2006.01)
*H04M 3/42* (2006.01)

(52) U.S. Cl.
USPC ............. 340/686.1; 340/539.13; 340/539.11; 340/539.15; 340/7.55; 455/404.2; 455/414.2

(58) Field of Classification Search
USPC ...................................... 340/686.1
See application file for complete search history.

(56) References Cited

U.S. PATENT DOCUMENTS

| | | | |
|---|---|---|---|
| 5,257,257 A | 10/1993 | Chen et al. | |
| 5,491,486 A | 2/1996 | Welles, II et al. | |
| 5,686,910 A | 11/1997 | Timm et al. | |
| 5,689,269 A * | 11/1997 | Norris ....................... | 342/357.31 |
| 5,919,239 A | 7/1999 | Fraker et al. | |
| 5,991,692 A | 11/1999 | Spencer, II et al. | |
| 6,011,510 A | 1/2000 | Yee et al. | |
| 6,067,460 A | 5/2000 | Alanara et al. | |
| 6,075,458 A | 6/2000 | Ladner et al. | |
| 6,163,691 A | 12/2000 | Buettner et al. | |
| 6,463,272 B1 | 10/2002 | Wallace et al. | |
| 6,512,465 B2 | 1/2003 | Flick | |
| 6,542,591 B1 | 4/2003 | Amro et al. | |
| 6,574,489 B1 | 6/2003 | Uriya | |
| 6,609,064 B1 | 8/2003 | Dean | |

(Continued)

FOREIGN PATENT DOCUMENTS

EP     2 081 369 A1     7/2009
WO     0165334 A2     9/2001

(Continued)

OTHER PUBLICATIONS

Harris Corporation; European Search Report mailed May 3, 2012; European Application No. 12000338.9-2413.

(Continued)

*Primary Examiner* — Donnie Crosland
(74) *Attorney, Agent, or Firm* — Fox Rothschild, LLP; Robert J. Sacco

(57) ABSTRACT

A method (600, 700) for providing situational awareness to a first individual using a first electronic device (102, 106, 108, 112). The method comprises generating a situational awareness display (400, 500) comprising a first image (404a, 404b, 404c, 504a, 504b, ..., 504e) of a second individual using a second electronic device and information indicating a location of the second individual relative to the first individual. The situational awareness display is then displayed on the display screen of the first electronic device and/or the second electronic device. The situational awareness display can be generated and displayed prior to, concurrent with or subsequent to the start of a call. The image may be highlighted or otherwise marked to show when the second individual is speaking during the call. Additional images of individuals can be displayed within the situational awareness display if the call is a group call.

34 Claims, 7 Drawing Sheets

(56) References Cited

U.S. PATENT DOCUMENTS

| | | |
|---|---|---|
| 6,700,533 B1 | 3/2004 | Werb et al. |
| 6,765,528 B2 | 7/2004 | Tranchina et al. |
| 6,801,853 B2 | 10/2004 | Workman |
| 6,807,158 B2 | 10/2004 | Krishnamurthy et al. |
| 6,850,188 B1 * | 2/2005 | Lee et al. ............... 342/357.52 |
| 6,940,407 B2 | 9/2005 | Miranda-Knapp et al. |
| 6,970,544 B1 | 11/2005 | Reese |
| 7,005,963 B1 | 2/2006 | Scalisi et al. |
| 7,034,678 B2 | 4/2006 | Burkley et al. |
| 7,050,907 B1 | 5/2006 | Janky et al. |
| 7,079,837 B1 | 7/2006 | Sherman et al. |
| 7,085,358 B2 | 8/2006 | Ruckart |
| 7,085,590 B2 | 8/2006 | Kennedy et al. |
| 7,091,851 B2 | 8/2006 | Mason et al. |
| 7,091,852 B2 | 8/2006 | Mason et al. |
| 7,092,723 B2 | 8/2006 | Himmelstein |
| 7,095,312 B2 | 8/2006 | Erario et al. |
| 7,102,491 B2 | 9/2006 | Ando et al. |
| 7,145,454 B2 | 12/2006 | Linjama et al. |
| 7,164,117 B2 | 1/2007 | Breed et al. |
| 7,196,659 B1 | 3/2007 | Beason et al. |
| 7,206,611 B2 | 4/2007 | Wuthnow et al. |
| 7,216,053 B2 | 5/2007 | Rakkola et al. |
| 7,263,441 B1 | 8/2007 | Janky et al. |
| 7,269,638 B2 | 9/2007 | Vestergaard et al. |
| RE39,909 E | 11/2007 | Taylor, Jr. |
| 7,292,151 B2 | 11/2007 | Ferguson et al. |
| 7,292,723 B2 | 11/2007 | Tedesco et al. |
| 7,307,963 B2 | 12/2007 | Chow et al. |
| 7,313,476 B2 | 12/2007 | Nichols et al. |
| 7,379,015 B2 | 5/2008 | Workman |
| 7,398,153 B2 | 7/2008 | Workman et al. |
| 7,408,506 B2 | 8/2008 | Miller |
| 7,453,355 B2 | 11/2008 | Bergstrom et al. |
| 7,486,174 B2 | 2/2009 | Battista et al. |
| 7,498,925 B2 | 3/2009 | Battista |
| 7,619,515 B2 | 11/2009 | Valania |
| 7,755,566 B2 * | 7/2010 | Hoisko ............... 345/1.2 |
| 8,107,608 B2 * | 1/2012 | Sheha et al. ............ 379/207.12 |
| 2002/0045465 A1 | 4/2002 | Kishida et al. |
| 2002/0077086 A1 * | 6/2002 | Tuomela et al. ............... 455/414 |
| 2005/0030175 A1 | 2/2005 | Wolfe |
| 2005/0176454 A1 | 8/2005 | Chakraborty et al. |
| 2005/0179541 A1 | 8/2005 | Wolfe |
| 2006/0046755 A1 | 3/2006 | Kies |
| 2006/0063548 A1 | 3/2006 | Kim |
| 2006/0092865 A1 | 5/2006 | Williams |
| 2006/0172779 A1 | 8/2006 | Yoshida |
| 2006/0182248 A1 | 8/2006 | Smith et al. |
| 2006/0270421 A1 | 11/2006 | Phillips et al. |
| 2006/0282021 A1 | 12/2006 | DeVaul et al. |
| 2006/0293022 A1 | 12/2006 | Jindal et al. |
| 2007/0036100 A1 | 2/2007 | Shaffer et al. |
| 2007/0036118 A1 | 2/2007 | Shaffer et al. |
| 2007/0037596 A1 | 2/2007 | Shaffer et al. |
| 2007/0037610 A1 | 2/2007 | Logan |
| 2007/0054651 A1 | 3/2007 | Farmer et al. |
| 2007/0060045 A1 | 3/2007 | Prautzsch |
| 2007/0142034 A1 | 6/2007 | Clarke et al. |
| 2007/0143709 A1 | 6/2007 | Citrin et al. |
| 2007/0161383 A1 | 7/2007 | Caci |
| 2007/0191026 A1 | 8/2007 | Teplitsky |
| 2007/0226658 A1 | 9/2007 | Virk |
| 2007/0241888 A1 | 10/2007 | Mantovani et al. |
| 2007/0269030 A1 | 11/2007 | Shani |
| 2007/0270156 A9 | 11/2007 | Norman |
| 2007/0299473 A1 | 12/2007 | Matos |
| 2008/0026703 A1 | 1/2008 | Chakraborty et al. |
| 2008/0031275 A1 | 2/2008 | Janky et al. |
| 2008/0096597 A1 | 4/2008 | Vempati et al. |
| 2008/0122685 A1 | 5/2008 | Vassilovski |
| 2008/0129518 A1 | 6/2008 | Carlton-Foss |
| 2008/0140338 A1 | 6/2008 | No et al. |
| 2008/0152111 A1 | 6/2008 | Mock et al. |
| 2008/0205321 A1 | 8/2008 | Martinez |
| 2008/0242418 A1 | 10/2008 | Theimer et al. |
| 2008/0254811 A1 | 10/2008 | Stewart |
| 2009/0075631 A1 | 3/2009 | Lyle et al. |
| 2009/0174547 A1 | 7/2009 | Greene et al. |
| 2009/0207852 A1 | 8/2009 | Greene et al. |

FOREIGN PATENT DOCUMENTS

| | | |
|---|---|---|
| WO | 2007063499 A1 | 6/2007 |
| WO | 2008045620 A1 | 4/2008 |
| WO | WO-2008057133 | 5/2008 |

OTHER PUBLICATIONS

Endsley, Mica R.: "Toward a Theory of Situation Awareness in Dynamic Systems", Human Factors, 1995, 37(1), pp. 32-64.

* cited by examiner

US 8,552,881 B2

ELECTRONIC DEVICE WITH A SITUATIONAL AWARENESS FUNCTION

BACKGROUND OF THE INVENTION

1. Statement of the Technical Field

The inventive arrangements relate to electronic devices, and more particularly to systems and method for providing enhanced situational awareness to users of electronic devices (e.g., communication devices).

2. Description of the Related Art

There are various communication networks known in the art. Such communication networks include a Land Mobile Radio (LMR) network, a Wideband Code Division Multiple Access (WCDMA) based network, a Code Division Multiple Access (CDMA) based network, a Wireless Local Area Network (WLAN), an Enhanced Data rates for GSM Evolution (EDGE) based network and a Long Term Evolution (LTE) based network. Each of these communication networks comprises a plurality of communication devices and network equipment configured to facilitate communications between the communication devices. Each communication network often provides an individual call service and a group call service to service users. The individual call service is a service by which a service user (e.g., a first responder) is able to talk to another service user (e.g., another first responder). The group call service is a service by which a service user (e.g., a first responder) is able to simultaneously talk to other service users (e.g., other first responders) associated with a particular talkgroup or where a service user (e.g., internet user) is able to simultaneously talk to other service users (e.g., other internet users) associated with a particular social media profile. Each of the call services can be implemented by a Push-To-Talk (PTT) call service. The PTT call service is an instant service by which the PTT service user is able to immediately talk to one or more other PTT service users by pushing a key or button of a communication device.

During operation, a service user can be engaged in or monitoring one or more individual calls and/or group calls at any given time. In this scenario, a communication device (e.g., an LMR radio, a cellular telephone and/or a dispatch console) utilized by the service user receives packets including speech from other members of the calls. The packets are processed for obtaining speech, identifiers for the portable communication devices (e.g., a source unit identifier or a phone number) and/or alias names for the respective members of the calls (e.g., car 54 or Sergeant Smith). The speech is output from the portable communication device in an audio format via a speaker thereof. Alternatively or additionally, the speech is converted to text which is displayed on a display screen of the communication device. The identifiers and/or alias names are displayed on a display screen of the portable communication device for facilitating the recognition of the service users which are presently speaking during a call.

Despite the advantages of the above described call service process, it suffers from certain drawbacks. For example, if two people are simply acquaintances, then they may be unfamiliar with each other's alias names, communication device identifiers and voices. As such, the people may have difficulty recognizing each other based on said identifiers, said alias names and/or said voices. Also, the location of the people relative to each other can not be determined based on alias names and communication device identifiers.

SUMMARY OF THE INVENTION

Embodiments of the present invention concern implementing systems and methods for providing situational awareness to individuals using electronic devices (e.g., communication devices). The methods generally involve generating a situational awareness display at a first electronic device, and subsequently displaying the situational awareness display on a display screen of the first electronic device. The situational awareness display can include, but is not limited to, a geographic map or a matrix of images. The situational awareness display comprises a first image of a first individual using a second electronic device. The first image can include, but is not limited to, an electronic photo image or a thumbnail size electronic photo image. The first image can be highlighted or otherwise marked so as to indicate a characteristic of the first individual or a talkgroup to which the first individual belongs. The marking can include an icon (e.g., a badge) displayed on or adjacent to the first image. The situational awareness display also comprises information indicating a location of the second electronic device relative to the first electronic device. For example, if the situational awareness display comprises a geographic map, then the first image is located a distance from a reference point within the geographic map so as to show a location of the second electronic device within a geographic area relative to a location of the first electronic device within the geographic area. In contrast, if the situational awareness display comprises a matrix of images, then the first image is highlighted or marked so as to show the distance between the first and second electronic devices. The marking can include, but is not limited to, a border having a thickness representative of said distance. Embodiments of the present invention are not limited in this regard.

According to aspects of the present invention, the situational awareness display is displayed prior to, concurrently with or shortly after the start of a call or other type of electronic communication (e.g., electronic mail message or text message). The call or other type of electronic communication can be initiated in response to a touch within a display area of the display screen at a location corresponding to the location at which the first image is displayed in the display area. If the situational awareness display is displayed concurrently with or shortly after the start of the call or other type of electronic communication, then the image data defining the first image is retrieved from a data store (internal or external to the first communication device) in response to the reception of a transmission (e.g., a call transmission) from the second electronic device. The image data can alternatively be retrieved in response to a call transmission received on a channel associated with a particular talkgroup. In either scenario, the image data can be retrieved from the data store using information contained in the transmission. Such data includes, but is not limited to, a source unit identifier, a destination unit identifier and/or a destination talkgroup identifier.

In the call scenarios, the first image is highlighted or marked in response to the reception of a call transmission from the second electronic device. The highlighting or marking provides a means for indicating that the first individual using the second electronic device is speaking during an active call. When the first individual stops speaking or the call transmission is complete, the highlighting or marking is removed from the first image. Alternatively or additionally, the size of the first image can be changed (e.g., enlarged) when the first individual starts speaking during the active call, i.e., when a call transmission is received from the second electronic device. The size of the first image can also be changed (e.g., reduced) when the first individual stops speaking during the active call, i.e., when the call transmission is complete. The first image can be removed from the display screen when an active call is terminated or a new call begins.

If a call is a group call, then the situational awareness display is automatically updated to include images of second individuals when they log into a corresponding talkgroup or join an active group call. Similarly, the situational awareness display is automatically updated by removing one or more images when individuals log out of the corresponding talkgroup or leave an active group call.

According to other aspects of the present invention, a call report is generated by the first electronic device. The call report includes, but is not limited to, call information and an image of at least one individual who participated in a call identified by the call information. The call report may be sent from the first electronic device to a centrally located activity device (e.g., a network manager or an activity warehouse). Thereafter, call reports can be run from the centrally located activity device. The centrally located activity device can display the call reports to users thereof. The images presented in the call reports provide a means for easily identifying a caller or talkgroup members who participated in a call. The call reports may be stored in the form of a history log.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
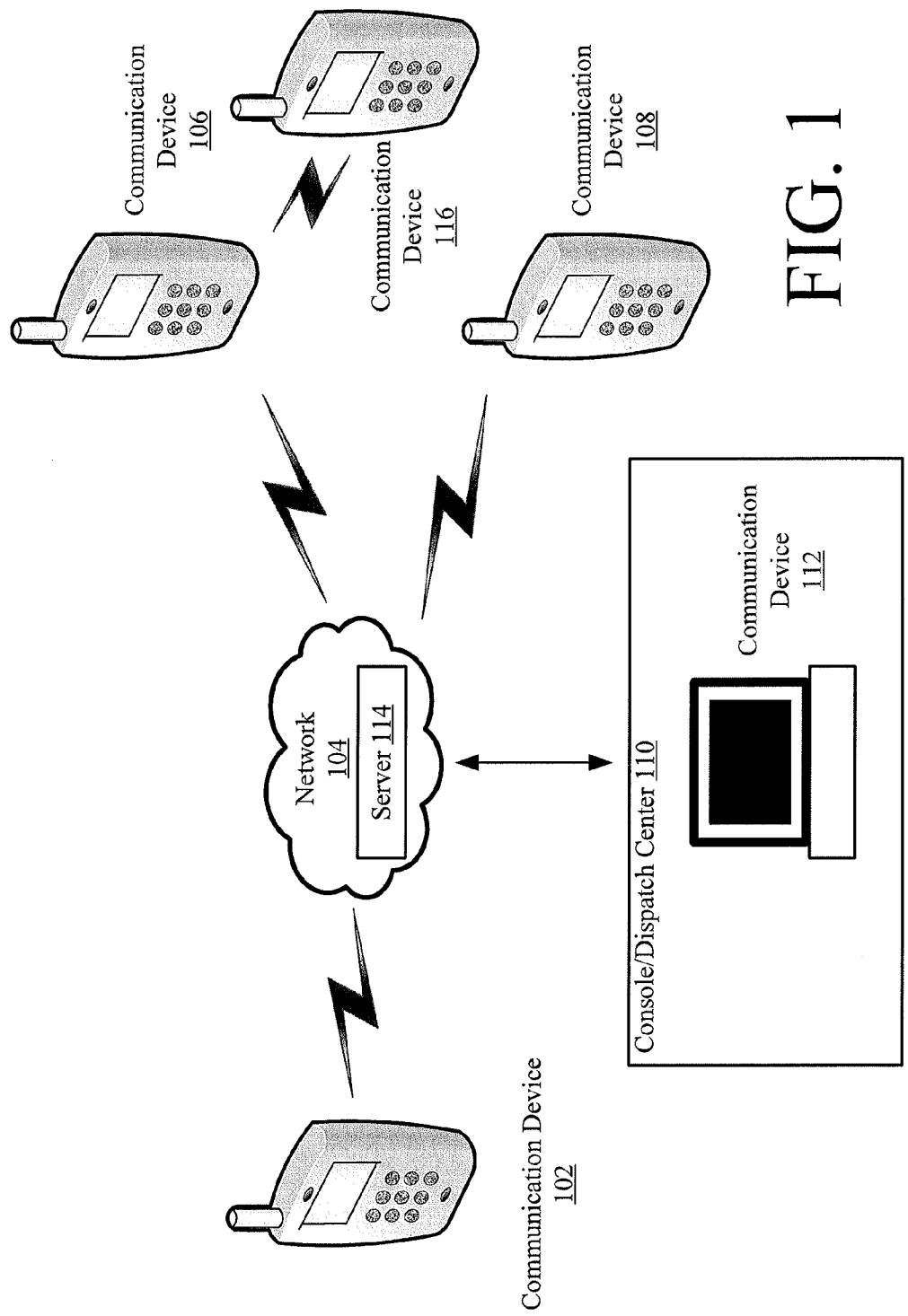
FIG. 1 is a conceptual diagram of an exemplary communication system that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present invention generally concerns implementing systems and methods for providing enhanced situational awareness to users of electronic devices. The phrase "situational awareness", as used herein, refers to "the perception of elements in the environment within a volume of time and space, the comprehension of their meaning, and the projection of their status in the near future." See Endsley, M. R. (1995), *Toward a theory of situation awareness in dynamic systems*, Human Factors 37(1), 32-64. Situational awareness is provided by the present invention through (a) the display of people's images on an electronic device and/or (b) the display of information indicating the people's locations relative to each other. The images can include, but are not limited to, electronic photo images and/or thumbnail size electronic photo images. Electronic photo images and thumbnail size electronic photo images are well known in the art, and therefore will not be described herein.

In some embodiments, the present invention is implemented in a communication system comprising a plurality of communication devices (e.g., radios and/or consoles). In this scenario, the methods generally involve displaying on a display screen of at least one of the communication devices one or more situational awareness displays. Each situational awareness display can include, but is not limited to, a map and/or a matrix. In either scenario, the situational awareness display includes: at least one image of an individual participating in an individual call or a group call; information indicating the relative locations of individuals participating in said individual call or said group call; and/or information indicating which individual of said individual call or said group call is presently speaking. By viewing the situational awareness display, the user of the communication device is able to instantaneously recognize the individuals participating in a call, instantaneously determine the relative locations of the individuals and/or instantaneously determine which one of the individuals is presently speaking during said call.

The present invention can be used in a variety of applications. Such applications include, but are not limited to, communication system applications, Global Positioning System (GPS) applications, traffic control applications, military command and control applications, tactical applications, emergency services applications, driving applications and any other application in which situational awareness is needed. Tactical applications include, but are not limited to, those applications in which communication devices (e.g., radios) communicate directly with each other or indirectly with each other through a repeater. Exemplary implementing systems will be described in relation to FIGS. 1-5. Exemplary method embodiments of the present invention will be described below in relation to FIGS. 6-7.

Exemplary Communication System Implementing the Present Invention

Referring now to FIG. 1, there is provided a block diagram of a communication system 100 that implements one or more method embodiments of the present invention. The communication system 100 includes a Land Mobile Radio (LMR) based system or a cellular based system. Accordingly, the communication system 100 comprises communication devices 102, 106, 108, 116, a network 104 and a console/dispatch center 110 including a communication device 112. The console/dispatch center 110 can be a stationary center (e.g., a home or an office) or a mobile center (e.g., a vehicle or a supervisor on foot). If the console/dispatch center 110 is a dispatch center, then it can include, but is not limited to, an emergency communication center, an agency communication center, an interagency communication center and any other communication center which provides dispatching and logistical support for personnel management.

The communication devices 102, 106, 108, 112, 116 are generally configured to provide an individual call service and/or a group call service to service users. The individual group call service is a service by which a service user is able to talk to another service user. The group call service is a service by which a service user is able to simultaneously talk to other service users associated with a particular talkgroup or social media profile. Each of the call services can be implemented by a PTT call service. The PTT call service is an instant service by which the PTT service user is able to immediately talk to one or more other PTT service users by pushing a key or button of a communication device 102, 106, 108, 112, 116.

Figure 4:
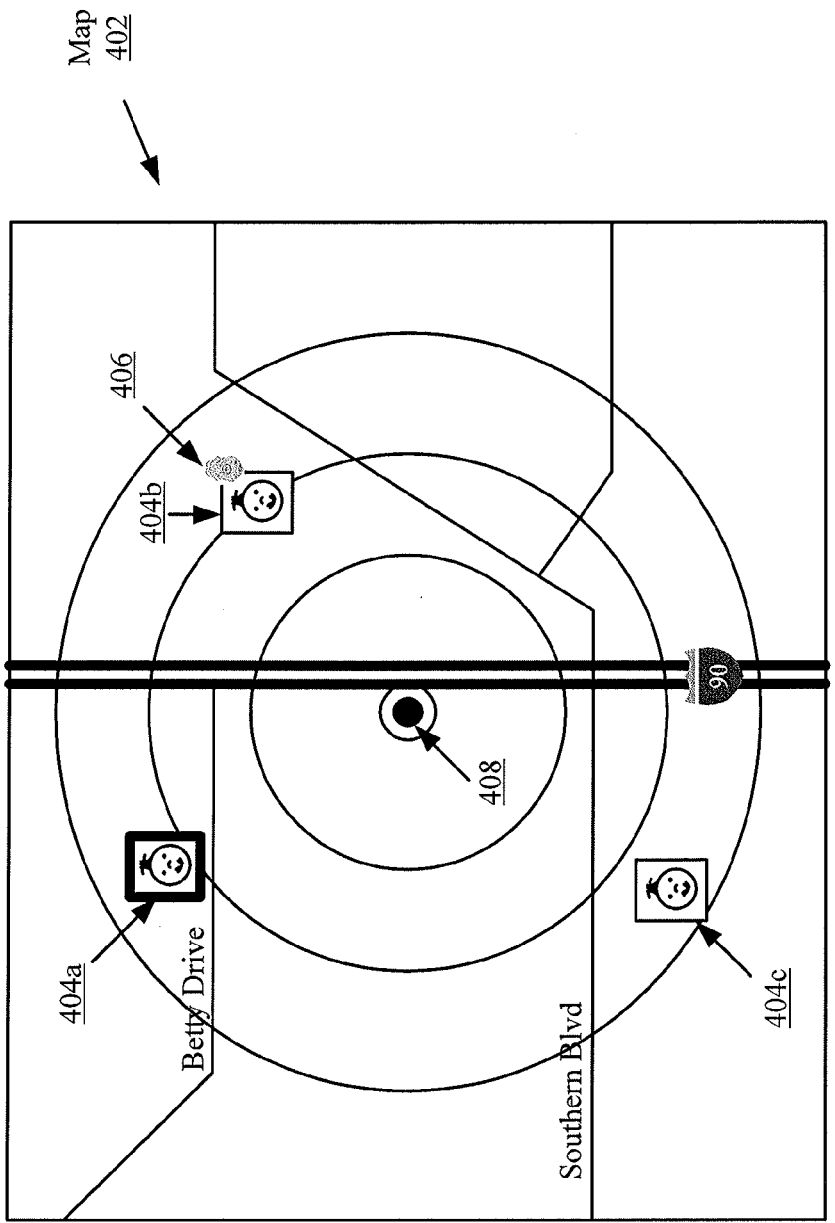
FIG. 4 is a schematic illustration of a first exemplary situational awareness display that is useful for understanding the present invention.
Figure 5:
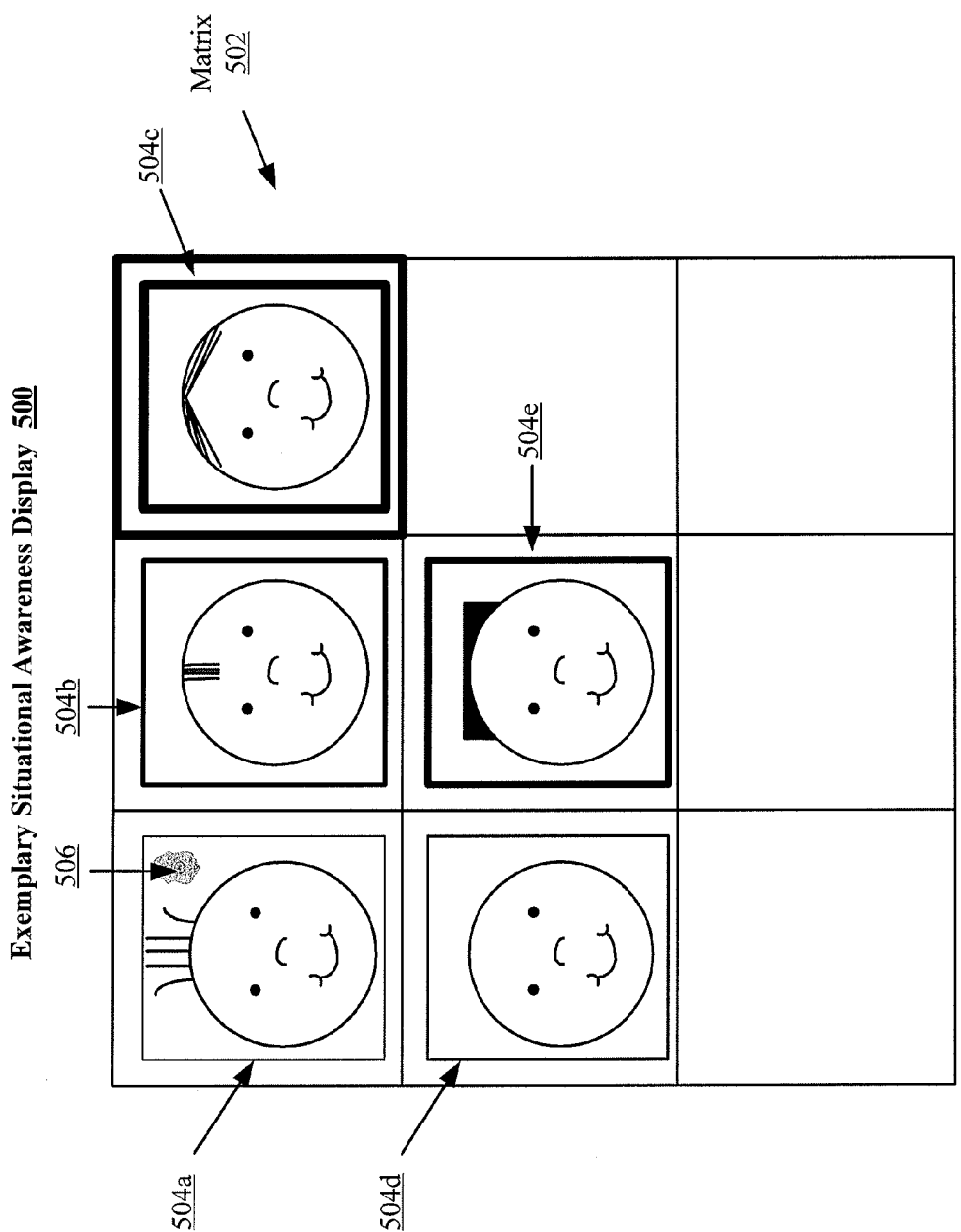
FIG. 5 is a schematic illustration a second exemplary situational awareness display that is useful for understanding the present invention.

The communication devices 102, 106, 108, 112, 116 are also configured to provide a situational awareness service to service users. The situational awareness service is a service by which a service user is able to: instantaneously recognize individuals participating in an individual call or a group call, instantaneously determine the relative locations of the individuals; and/or instantaneously determine which one of the individuals is presently speaking during said individual call or group call. In this regard, the situational awareness service provides a means by which one or more situational awareness displays can be presented to the service users. Each situational awareness display includes, but is not limited to, a map and/or a matrix. A schematic illustration of an exemplary map is provided in FIG. 4. A schematic illustration of an exemplary matrix is provided in FIG. 5. FIGS. 4-5 will be described in detail below. Still, a brief discussion of exemplary situational awareness displays is now provided.

In the map scenario, the situational awareness display includes a map (e.g., map 402 of FIG. 4) with images of individuals (e.g., images 404a, 404b, 404c of FIG. 4) displayed thereon. The images are placed at locations on the map which indicate the positions of the corresponding communication devices 102, 106, 108, 112, 116 relative to each other. One or more of the images can be highlighted or otherwise marked so as to indicate that a particular individual is presently speaking during an individual call or a group call. Also, one or more icons (e.g., icon 406 of FIG. 4) can be displayed with the images. For example, a police chief badge icon could be displayed with the image of the police chief. A sergeant badge icon could be displayed with an image of the sergeant. The images can include, but are not limited to, electronic photo images and/or thumbnail size electronic photo images.

In the matrix scenario, the situational awareness display includes a matrix (e.g., matrix 502 of FIG. 5) of images of individuals (e.g., images 504a, 504b, ..., 504e of FIG. 5). The images can be highlighted or otherwise marked so as to indicate: the relative locations between the corresponding communication devices; and/or that a particular individual is presently speaking during an individual call or a group call. Also, one or more icons (e.g., icon 506) can be displayed with the images. The images can include, but are not limited to, electronic photo images and/or thumbnail size electronic photo images.

The network 104 allows for communications between the communication devices 102, 106, 108 and/or console/dispatch center 110. As such, the network 104 can include, but is not limited to, servers 114 and other devices to which each of the communication devices 102, 106, 108 and/or console/dispatch center 110 can connect via wired or wireless communication links. The communication links can be trusted communication links in which secure software (e.g., cryptographic software) and/or secure hardware (e.g., tamper proof hardware) is employed.

Figure 2:
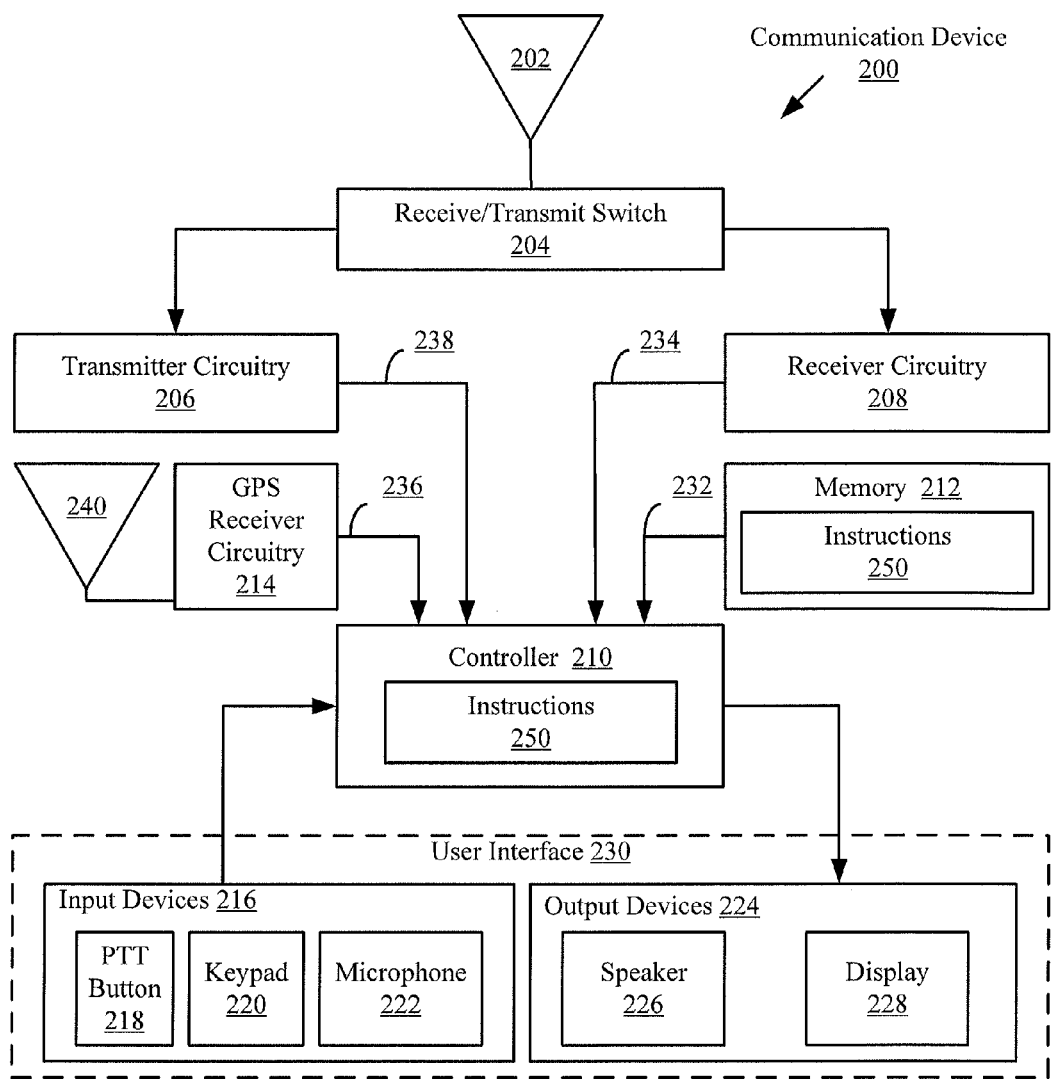
FIG. 2 is a block diagram of an exemplary communication device that is useful for understanding the present invention.

Referring now to FIG. 2, there is provided a detailed block diagram of the communication device 200. The communication devices 102, 106, 108, 116 of FIG. 1 are the same as or similar to the communication device 200. As such, the following discussion of the communication device 200 is sufficient for understanding the communication devices 102, 106, 108, 116 of FIG. 1. Notably, the communication device 200 can include more or less components than those shown in FIG. 2. However, the components shown are sufficient to disclose an illustrative embodiment implementing the present invention. The hardware architecture of FIG. 2 represents one embodiment of a representative communication device configured to facilitate the provision of a call service and a situational awareness service to a user thereof. In this regard, the communication device of FIG. 2 implements a method for providing situational awareness to service users in accordance with embodiments of the present invention. Exemplary embodiments of said method will be described below in relation to FIGS. 6-7.

As shown in FIG. 2, the communication device 200 comprises an antenna 202 for receiving and transmitting Radio Frequency (RF) signals. A receive/transmit (Rx/Tx) switch 204 selectively couples the antenna 202 to the transmitter circuitry 206 and receiver circuitry 208 in a manner familiar to those skilled in the art. The receiver circuitry 208 demodulates and decodes the RF signals received from a network (e.g., the network 104 of FIG. 1) to derive information therefrom. The receiver circuitry 208 is coupled to a controller 210 via an electrical connection 234. The receiver circuitry 208 provides the decoded RF signal information to the controller 210. The controller 210 uses the decoded RF signal information in accordance with the function(s) of the communication device 200. For example, if the RF signals include location information of other communication devices, then the location information can be used by the controller 210 to track the movement of other communication devices. Also, the controller 210 may select an image based on a location specified by the received location information. Thereafter, the controller 210 may cause the image to be displayed to a user of the communication device 200. Alternatively, the controller 210 can cause a location of the displayed image to be changed within a display based on the received location information. The received location information can include GPS location information and/or any other type of location information. Embodiments of the present invention are not limited in this regard.

The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device (e.g., network equipment of network 104 of FIG. 1).

An optional antenna 240 is coupled to an optional Global Positioning System (GPS) receiver circuitry 214 for receiving GPS signals. The GPS receiver circuitry 214 demodulates and decodes the GPS signals to extract GPS location information therefrom. The GPS location information indicates the location of the communication device 200. The GPS receiver circuitry 214 provides the decoded GPS location information to the controller 210. As such, the GPS receiver circuitry 214 is coupled to the controller 210 via an electrical connection 236. Notably, the present invention is not limited to GPS based methods for determining a location of the communication device 200. Other methods for determining a location of a communication device can be used with the present invention without limitation.

The controller 210 uses the decoded GPS location information in accordance with the function(s) of the communication device 200. For example, the GPS location information and/or other location information can be used to generate a geographic map showing the location of the communication device 200. The GPS location information and/or other location information can also be used to determine the actual or approximate distance between the communication device 200 and other communication devices. The GPS location information and/or other location information can be periodically communicated to other communication devices (e.g., communication devices 102, 106, 108, 112 or 116 of FIG. 1). In this scenario, the location information can be periodically communicated to other communication devices using a beacon signal. Alternatively or additionally, the GPS location information and/or other location information can be communicated to other communication devices in response to the depression or release of the PTT button 218 and/or in response to requests received from the other communication devices. The location information can also be communicated to other communication devices at the start of or during a data transmission. For example, location information can be appended to the end of a voice call. In any of these scenarios, an indicator (e.g., a bar) can be displayed on a display screen of the other communication devices to show how recent a location information update was. Embodiments of the present invention are not limited in this regard. Any method of obtaining location information can be used with the present invention without limitation. Similarly, any method of communicating location information at particularly times between communication devices can be used with the present invention without limitation.

Referring again to FIG. 2, the controller 210 stores the decoded RF signal information and the decoded GPS location information in a memory 212 of the communication device 200. Accordingly, the memory 212 is connected to and accessible by the controller 210 through an electrical connection 232. The memory 212 can be a volatile memory and/or a non-volatile memory. For example, the memory 212 can include, but is not limited to, a Random Access Memory (RAM), a Dynamic Random Access Memory (DRAM), a Static Random Access Memory (SRAM), Read-Only Memory (ROM) and flash memory. The memory 212 can also have stored therein icon data, unit identifiers, talkgroup identifiers, names of individuals and/or image data that defines one or more images of individuals. The memory 212 can further have lists or tables stored therein. At least one of the lists and/or tables maps unit identifiers to the icon data, talkgroup identifiers, names and/or image data. Such a list and/or table can be used to generate a situational awareness display including icons and/or images of members of a call.

As shown in FIG. 2, one or more sets of instructions 250 are stored in the memory 212. The instructions 250 can also reside, completely or at least partially, within the controller 210 during execution thereof by the communication device 200. In this regard, the memory 212 and the controller 210 can constitute machine-readable media. The term "machine-readable media", as used here, refers to a single medium or multiple media that store the one or more sets of instructions 250. The term "machine-readable media", as used here, also refers to any medium that is capable of storing, encoding or carrying the set of instructions 250 for execution by the communication device 200 and that cause the communication device 200 to perform one or more of the methodologies of the present disclosure.

The controller 210 is also connected to a user interface 230. The user interface 230 is comprised of input devices 216, output devices 224, and software routines (not shown in FIG. 2) configured to allow a user to interact with and control software applications (not shown in FIG. 2) installed on the computing device 200. Such input and output devices respectively include, but are not limited to, a display 228, a speaker 226, a keypad 220, a directional pad (not shown in FIG. 2), a directional knob (not shown in FIG. 2), a microphone 222 and a PTT button 218. The display 228 can be designed to accept touch screen inputs. For example, a user can initiate a call to a particular individual by touching an icon or an image of the individual which is displayed on the display 228. Similarly, a user can initiate a call to a group of individuals by touching an image or icon which is displayed on the display 228. In this scenario, the images can be displayed on the display 228 independent of and/or in conjunction with a situational awareness display. If the images are displayed independent of a situational awareness display, then the images can be displayed in response to: a user selection of a command from a menu of commands; and/or a reception of a text message, email message or other type of electronic message from an individual. In some embodiments, the received electronic messages (e.g., text and email messages) include location information. In this scenario, the images can be selected based at least on the location information. In other embodiments, the electronic messages are absent of location information. In this scenario, the images can be selected based on an identifier, such as a communication device identifier, an individual identifier, an email address and/or a group identifier. Embodiments of the present invention are not limited in this regard.

The user interface 230 is operative to facilitate a user-software interaction for launching individual call applications (not shown in FIG. 2), group call applications (not shown in FIG. 2), PTT call applications (not shown in FIG. 2), situational awareness applications (not shown in FIG. 2), social media applications, internet applications and other types of applications installed on the computing device 200. The individual call, group call and PTT call applications (not shown in FIG. 2) are operative to provide a call service to a user of the communication device 200.

The situational awareness applications (not shown in FIG. 2) are operative to facilitate: the retrieval of image data and/or icon data from an internal memory 212 or an external data store (not shown) in response to the reception of a transmission from a particular individual or a particular talkgroup and/or in response to a transmission received on a channel associated with a particular talkgroup; the display of an image defined by the retrieved image data and/or an icon defined by the retrieved icon data on the display 228; the highlighting or marking of a displayed image and/or icon so as to indicate a characteristic of an associated individual or talkgroup; the highlighting or marking of a displayed image and/or icon so as to indicate a location of an associated communication device relative to another communication device; and/or the highlighting or marking of a displayed image or icon so as to indicate that an associated individual is presently speaking during a call. As noted above, the images and/or icons can be displayed on a map, such as that shown in FIG. 4. Alternatively or additionally, the images and/or icons can be displayed in a matrix format, such as that shown in FIG. 5. FIGS. 4-5 will be described in detail below.

In some embodiments, the images and/or icons are retrieved from internal memory 212 or an external data store (not shown) based on source unit IDentifiers (IDs), destination unit IDs and/or destination talkgroup IDs contained in traffic packets. For example, a retrieval of data associated with a particular image and/or icon can be triggered by values of particular bits contained in an incoming traffic packet, where the bit values identify a communication device from which the traffic packet was sent and/or a talkgroup to which a communication device belongs. Additionally or alternatively, a retrieval of data associated with a particular image and/or icon can be triggered by values contained in location information received at the communication device 200. The location information can include GPS location information or any other type of location information. Embodiments of the present invention are not limited in this regard.

In some embodiments, the proximity of communication devices can be gleaned from location information and/or tower information. In the tower information scenario, images associated with first communication devices communicating via a first tower can be displayed in a first manner, while images associated with second communication device communicating via a second tower can be displayed in a second manner. Accordingly, a general sense can be obtained that the first communication devices are closer to communication device 200 than the second communication devices. Embodiments of the present invention are not limited in this regard.

The PTT button 218 provides a user with a single key/button press to initiate a predetermined PTT application or function of the communication device 200. The PTT application facilitates the provision of a PTT service to a user of the communication device 200. As such, the PTT application is operative to perform PTT communication operations. The PTT communication operations can include, but are not limited to, message generation operations, message communication operations, voice packet recording operations, voice packet queuing operations and voice packet communication operations.

Figure 3:
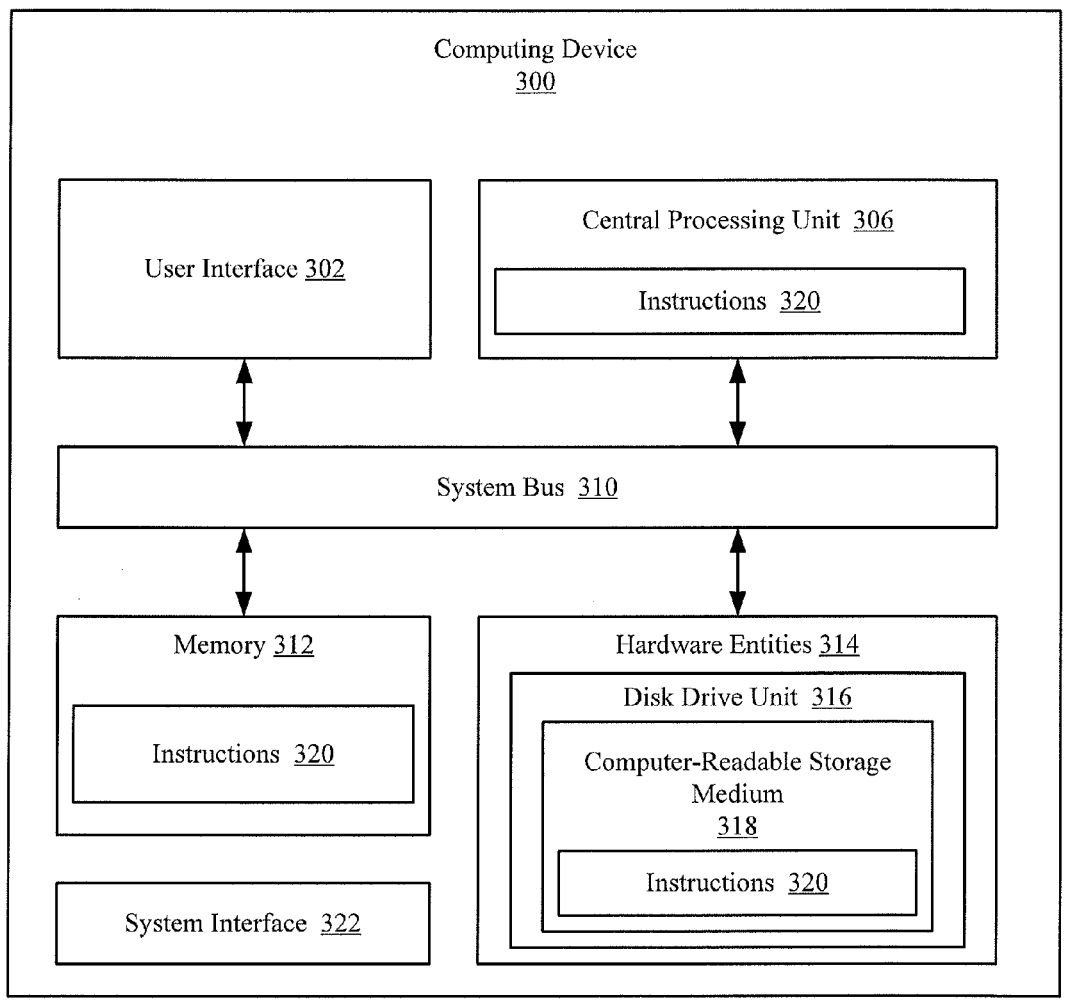
FIG. 3 is a block diagram of an exemplary computing device that is useful for understanding the present invention.

Referring now to FIG. 3, there is provided a more detailed block diagram of a computing device 300 that is useful for understanding the present invention. The server 114 and communication device 112 of FIG. 1 is the same as or similar to the computing device 300. As such, the following discussion of the computing device 300 is sufficient for understanding the server 114 and communication device 112 of FIG. 1. Notably, the computing device 300 can include more or less components than those shown in FIG. 3. However, the components shown are sufficient to disclose an illustrative embodiment implementing the present invention. The hardware architecture of FIG. 3 represents one embodiment of a representative computing device configured to facilitate the provision of an individual call service, a group call service and a situational awareness service to a user thereof. As such, the computing device 300 implements a method for providing situational awareness in accordance with embodiments of the present invention. Exemplary embodiments of the method will be described in detail below in relation to FIGS. 6-7.

As shown in FIG. 3, the computing device 300 includes a system interface 322, a user interface 302, a Central Processing Unit (CPU) 306, a system bus 310, a memory 312 connected to and accessible by other portions of computing device 300 through system bus 310, and hardware entities 314 connected to system bus 310. At least some of the hardware entities 314 perform actions involving access to and use of memory 312, which can be a Random Access Memory (RAM), a disk driver and/or a Compact Disc Read Only Memory (CD-ROM).

System interface 322 allows the computing device 300 to communicate directly or indirectly with external communication devices (e.g., communication devices 102, 106, 108, 116 of FIG. 1). If the computing device 300 is communicating indirectly with the external communication device, then the computing device 300 is sending and receiving communications through a common network (e.g., the network 104 shown in FIG. 1).

Hardware entities 314 can include microprocessors, Application Specific Integrated Circuits (ASICs) and other hardware. Hardware entities 314 can include a microprocessor programmed for facilitating the provision of individual call services, group call services and situational awareness services to users thereof. In this regard, it should be understood that the microprocessor can access and run individual call applications (not shown in FIG. 3), group call applications (not shown in FIG. 3), PTT call applications (not shown in FIG. 3), internet applications (not shown in FIG. 3), situational awareness applications (not shown in FIG. 3) and other types of applications installed on the computing device 300. The individual call applications (not shown in FIG. 3), group call applications (not shown in FIG. 3) and PTT call applications (not shown in FIG. 3) are operative to facilitate the provision of a call service to a user of the computing device 300 and/or a remote communication device (e.g., 102, 106, 108, 116).

The situational awareness applications (not shown in FIG. 3) are operative to facilitate: the retrieval of image data and/or icon data from internal memory 312 or an external data store (not shown) in response to the reception of a transmission from a particular individual or a particular talkgroup and/or in response to a transmission received on a channel associated with a particular talkgroup; the display of an image defined by the retrieved image data and/or an icon defined by the retrieved image data on the display 228 of a communications device 102, 106, 108, 116 and/or on a display of user interface 302; the highlighting or marking of a displayed image and/or icon so as to indicate a characteristic of an associated individual or talkgroup; the highlighting or marking of a displayed image and/or icon so as to indicate a location of an associated communication device relative to another communication device; and/or the highlighting or marking of a displayed image or icon so as to indicate that an associated individual is presently speaking during a call. As noted above, the images and/or icons can be displayed on a map, such as that shown in FIG. 4. Alternatively or additionally, the images and/or icons can be displayed in a matrix format, such as that shown in FIG. 5. FIGS. 4-5 will be described in detail below.

In some embodiments, the images and/or icons are retrieved from internal memory 312 or an external data store (not shown) based on source unit IDs, destination unit IDs and/or destination talkgroup IDs contained in traffic packets. For example, a retrieval of data associated with a particular image and/or icon can be triggered by values of particular bits contained in an incoming traffic packet, where the bit values identify a communication device from which the traffic packet was sent and/or a talkgroup to which a communication device belongs. Embodiments of the present invention are not limited in this regard.

As shown in FIG. 3, the hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Notably, a display of the user interface 302 can be designed to accept touch screen inputs. For example, a user can initiate a call to a particular individual by touching an icon or an image of the individual which is displayed on the display. Similarly, a user can initiate a call to a group of individuals by touching an image or icon which is displayed on the display. In this scenario, the images can be displayed on the display independent of and/or in conjunction with a situational awareness display. If the images are displayed independent of a situational awareness display, then the images can be displayed in response to: a user selection of a command from a menu of commands; and/or a reception of a text message, email message or other type of electronic message from an individual. Embodiments of the present invention are not limited in this regard.

The computing device 300 can be configured to generate and output call reports. The call reports provide a list of calls made during a selected period of time. Each call is described in the list by the following information: an image of an associated individual; an identifier; and/or an alias name. The call reports can include timestamps indicating the time calls were made and dates indicating the day, month and/or year calls were made. Embodiments of the present invention are not limited in this regard. The call reports can illustrate information in other formats other than list formats. For example, the call reports can alternatively or additionally include graphs, charts and/or tables.

Referring now to FIG. 4, there is provided a schematic illustration of an exemplary situational awareness display 400 that is useful for understanding the present invention. As shown in FIG. 4, the situation awareness display 400 includes a geographic map 402 providing a visual representation of a particular geographic area. A plurality of images 404a, 404b, 404c and an optional icon 406 are displayed on the map 402. Although three (3) images and one (1) icon are shown in FIG. 4, the present invention is not limited in this regard. The geographic map 402 can include any number of images and/or icons selected in accordance with a particular application. For example, the geographic map 402 can include images for individuals engaging in an active call or individual recently engaged in a terminated call. In this scenario, the geographic map 402 can be automatically updated to include more images as individual join the call or less images as individuals leave the call. Such an update of the geographic map 402 can be facilitated by a registration messages and a deregistration message sent in a control channel of a network. Each registration message can include a unit identifier identifying which communication device is currently logging into or registering with a talkgroup. Each deregistration message can include a unit identifier identifying which communication device is removing itself from a talkgroup. A receiving communication device can obtain and display an image in the situation awareness display 400 that is associated with the unit identifier contained in the registration message, and/or eliminate an image from the situation awareness display 400 that is associated with the unit identifier contained in the deregistration message. Embodiments of the present invention are not limited in this regard. For example, the image(s) can remain on the situation awareness display 400 throughout the duration of a call and for some time after a call has ended (e.g., one or more minutes, hours or days). In this scenario, the image(s) can remain on the situation awareness display 400 until a next call begins.

Each image 404a, 404b, 404c is an electronic photo image or thumbnail size electronic photo image of an individual participating in a call. As used, each of the images 404a, 404b, 404c is located a certain distance from a dot 408. The dot 408 may be located at the center of the map 402 as shown in FIG. 4 or at any other location within the map 402. The dot 408 shows the location of a receiving communication device (e.g., communication device 106 of FIG. 1). The images 404a, 404b, 404c represent the locations of other communication devices (e.g., communication devices 102, 108, 112 or 116 of FIG. 1) from which communications were received or are to be received.

As shown in FIG. 4, image 404a has a thicker border than images 404b, 404c. The thicker border represents that the individual shown in the image 404a is presently speaking during a call. Embodiments of the present invention are not limited in this regard. Other types of visual indicators can be used to illustrate that a particular individual is presently speaking during a call. These visual indicators can include, but are not limited to, color indicators (e.g., a green border or tint), icons, symbols and objects. Additionally or alternatively, the size of the image can be changed so as to indicate that the corresponding individual is presently speaking during a call.

During operation of a communication device, a user thereof can select a displayed image 404a, 404b, 404c to view detailed information about an individual and/or communication device associated with the image 404a, 404b, 404c. Such detailed information can include, but is not limited to, an identifier, an alias name and coordinates of a communication device. Also, the user can initiate a call to a particular individual simply by touching an image 404a, 404b, 404c of the situation awareness display 400.

Referring now to FIG. 5, there is provided a schematic illustration of another exemplary situational awareness display 500. The situation awareness display 400 includes a matrix 502 of images 504a, 504b, 504c, 504d, 504e and one or more icons 506 displayed on or adjacent to the images 504a, 504b, 504c, 504d, 504e. Although five (5) images and one (1) icon are shown in FIG. 5, the present invention is not limited in this regard. The matrix 502 can include any number of images and/or icons selected in accordance with a particular application. For example, the matrix 502 can include images for individuals engaging in an active group call or was engaged in a recently terminated call. In this scenario, the matrix 502 can be automatically updated to include more images as individual join the group call or less images as individuals leave the group call. Such an update of the matrix 502 can be facilitated by a registration messages and a deregistration message sent in a control channel of a network. Each registration message can include a unit identifier identifying which communication device is currently logging into or registering with a talkgroup. Each deregistration message can include a unit identifier identifying which communication device is removing itself from a talkgroup. A receiving communication device can obtain and display an image in the situation awareness display 400 that is associated with the unit identifier contained in the registration message, and/or eliminate an image from the situation awareness display 400 that is associated with the unit identifier contained in the deregistration message. Embodiments of the present invention are not limited in this regard. For example, the image(s) can remain on the situation awareness display 400 throughout the duration of a call and for some time after a call has ended. In this scenario, the image(s) can remain on the situation awareness display 400 until a next call begins.

As shown in FIG. 5, the images 504a, 504b, 504c, 504d, 504e have borders of different thicknesses. The thickness of each border indicates the distance between the corresponding communication device (e.g., communication device 102, 108, 112 or 116 of FIG. 1) and a receiving communication device (e.g., communication device 106 of FIG. 1). For example, image 504c has a thick border indicating that the corresponding individual and/or communication device is located a relatively large distance away from the receiving communication device. Image 504a has a thin border indicating that the corresponding individual and/or communication device is located a relatively small distance away from the receiving communication device. Embodiments of the present invention are not limited in this regard. Other types of visual indicators can be used to illustrate the distance between communication devices. For example, these visual indicators can include, but are not limited to, color indicators (e.g., a green border or tint), icons, symbols and objects. Additionally or alternatively, the sizes of the images 504a, 504b, 504c, 504d, 504e can be adjusted so as to indicate that relative distances between communication devices. In this scenario, the images 504a, 504b, 504c, 504d, 504e can have different overall sizes.

Also, the relative locations of the images within the matrix 502 can illustrate the proximity of communication devices. More particularly, an image may be presented adjacent to an image of a user of the receiving communication device, the center of the matrix 502, a corner of the matrix 502 or an edge of the matrix 502 so as to illustrate that the individual in the image is relatively close to the receiving communication device. For example, the individuals shown in images 504b and 504e are closer to the user shown in image 504c as compared to the individuals shown in images 504a and 504d. Embodiments of the present invention are not limited in this regard.

As shown in FIG. 5, image 504c has two (2) borders. The outer border represents that the individual shown in the image 504c is presently speaking during a call. Embodiments of the present invention are not limited in this regard. Other types of visual indicators can be used to illustrate which individual is presently speaking during a call. These visual indicators can include, but are not limited to, color indicators (e.g., a green border or tint), icons, symbols and objects. Additionally or alternatively, the size of the image can be changed so as to indicate that the corresponding individual is presently speaking during a call.

During operation of a communication device, a user thereof can select a displayed image 504a, 504b, 504c, 504d, 504e to view detailed information about an individual and/or communication device associated with the image 504a, 504b, 504c, 504d, 504e. Such detailed information can include, but is not limited to, an identifier, an alias name and coordinates of a communication device. Also, the user can initiate a call to a particular individual simply by touching an image 504a, 504b, 504c, 504d, 504e of the situational awareness display 500.

Embodiments of the present invention are not limited to the situational awareness display 500 configuration shown in FIG. 5. For example, if a communication device is currently engaged in an individual call, then a matrix can not be displayed. Instead, a single image can be displayed as a background for a display screen or wallpaper of the display screen. In this scenario, the image can be displayed as a background or wallpaper until a next call starts.

As evident from the above discussion, the communication system 100 implements one or more method embodiments of the present invention. The method embodiments of the present invention provide implementing systems with certain advantages over conventional communication devices. For example, the present invention provides a communication device that can provide improved situational awareness to users thereof. More particularly, the present invention provides users with the ability to: instantaneously recognize the individuals participating in a call; instantaneously determine the relative locations of the individuals; and/or instantaneously determine which one of the individuals is presently speaking during said call. The manner in which the above listed advantages of the present invention are achieved will become more evident as the discussion progresses.

Exemplary Method Embodiments of the Present Invention

Figure 6:
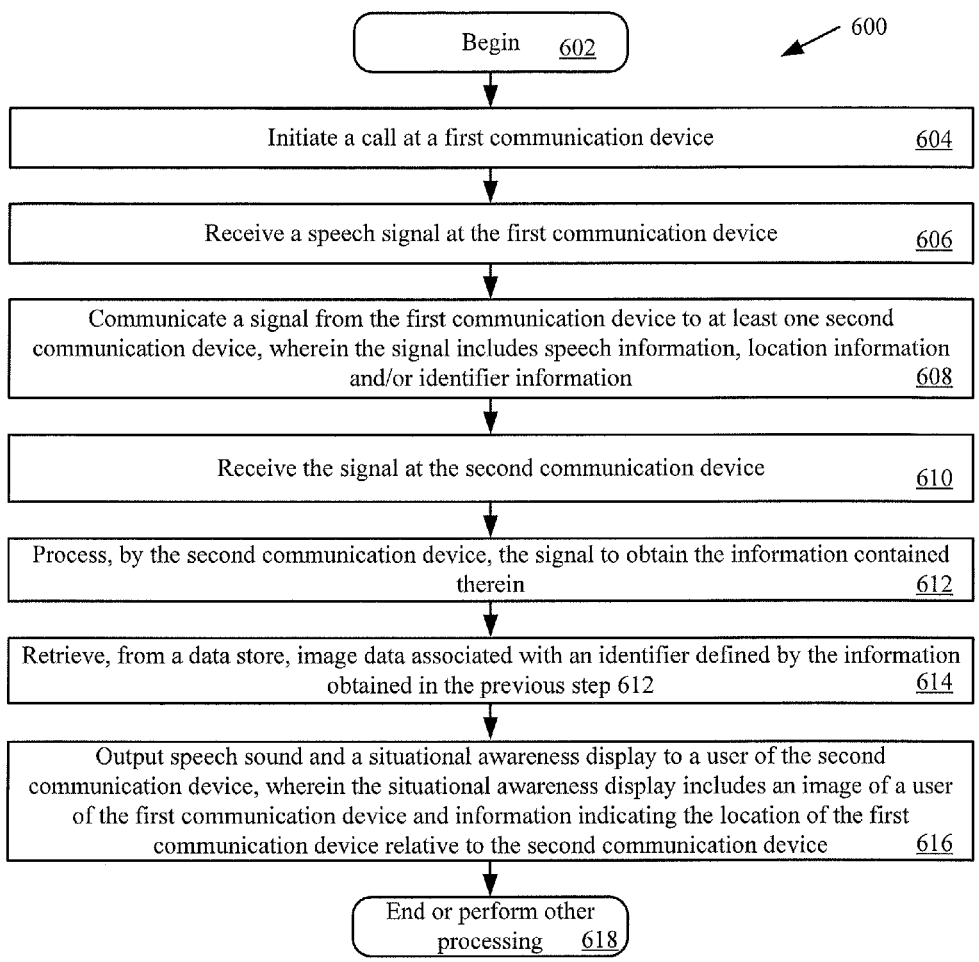
FIG. 6 is a flow diagram of a first exemplary method that is useful for understanding the present invention.

Referring now to FIG. 6, there is provided a flow diagram of an exemplary method 600 for providing situational awareness to a user of an electronic device (e.g., the communication device 102, 106, 108, 112 or, 116 of FIG. 1). As shown in FIG. 6, the method 600 begins with step 602 and continues with step 604. In step 604, a call is initiated at a first communication device (e.g., communication device 106 of FIG. 1). The call can be initiated by depressing a PTT button of the communication device. Thereafter, a user of the first communication device speaks into a microphone thereof. In effect, a speech signal is received at the first communication device in step 606. Next, step 608 is performed where a signal is communicated from the first communication device to at least one second communication device (e.g., communication device 102, 108, 112 and/or 116 of FIG. 1). The signal includes, but is not limited to, speech information, location information and identifier information. Notably, in some embodiments of the present invention, the location information is sent with or without the speech information. In other embodiments, the proximity of communication devices is determined based on login information, rather than the location information. In step 610, the signal is received at the second communication device.

At the second communication device, steps 612-616 are performed. Step 612 involves processing the received signal to obtain the information contained therein. Subsequently, image data is retrieved from a data store in step 614. The image data can be stored in the data store in association with an identifier (e.g., a communication device identifier). As such, the image data can be retrieved from the data store using the identifier information obtained from the received signal. In step 616, speech sound can be output to a user of the second communication device via a speaker. Alternatively, the speech can be converted to text. In this scenario, the text is output to the user of the second communication device via a display screen. Step 616 also involves displaying a situational awareness display on the display screen of the second communication device. The situational awareness display includes an image of the user of the first communication device. The situational awareness display can also include information indicating the location of the first communication device relative to the second communication device. Exemplary situational awareness displays are described above in relation to FIGS. 4-5. Notably, the situational awareness display can be output prior to, subsequent to or concurrently with the speech sound (or alternatively converted speech text). Also, the situational awareness display can remain on the display screen until a next call begins. When the next call begins, the situational awareness display can be updated or removed from the display. If the situational awareness display is removed from the display, then a new situational awareness display can be presented to the user. The new situational awareness display can be of the same type or of a different type than the previously presented situational awareness display. Upon completing step 616, the method 600 continues with step 618. In step 618, the method 600 ends or other processing is performed.

As described above in relation to FIG. 6, the second communication device performs actions to retrieve image data from an internal data store. Embodiments of the present invention are not limited in this regard. For example, a network node (e.g., server 114 of FIG. 1) can alternatively perform actions to retrieve image data from a data store external to the second communication device. In this scenario, the network node provides the image data to the second communication device prior to, subsequent to, or concurrently with the signal communicated from the first communication device. Such an alternative method is described in detail below in relation to FIG. 7.

Figure 7:
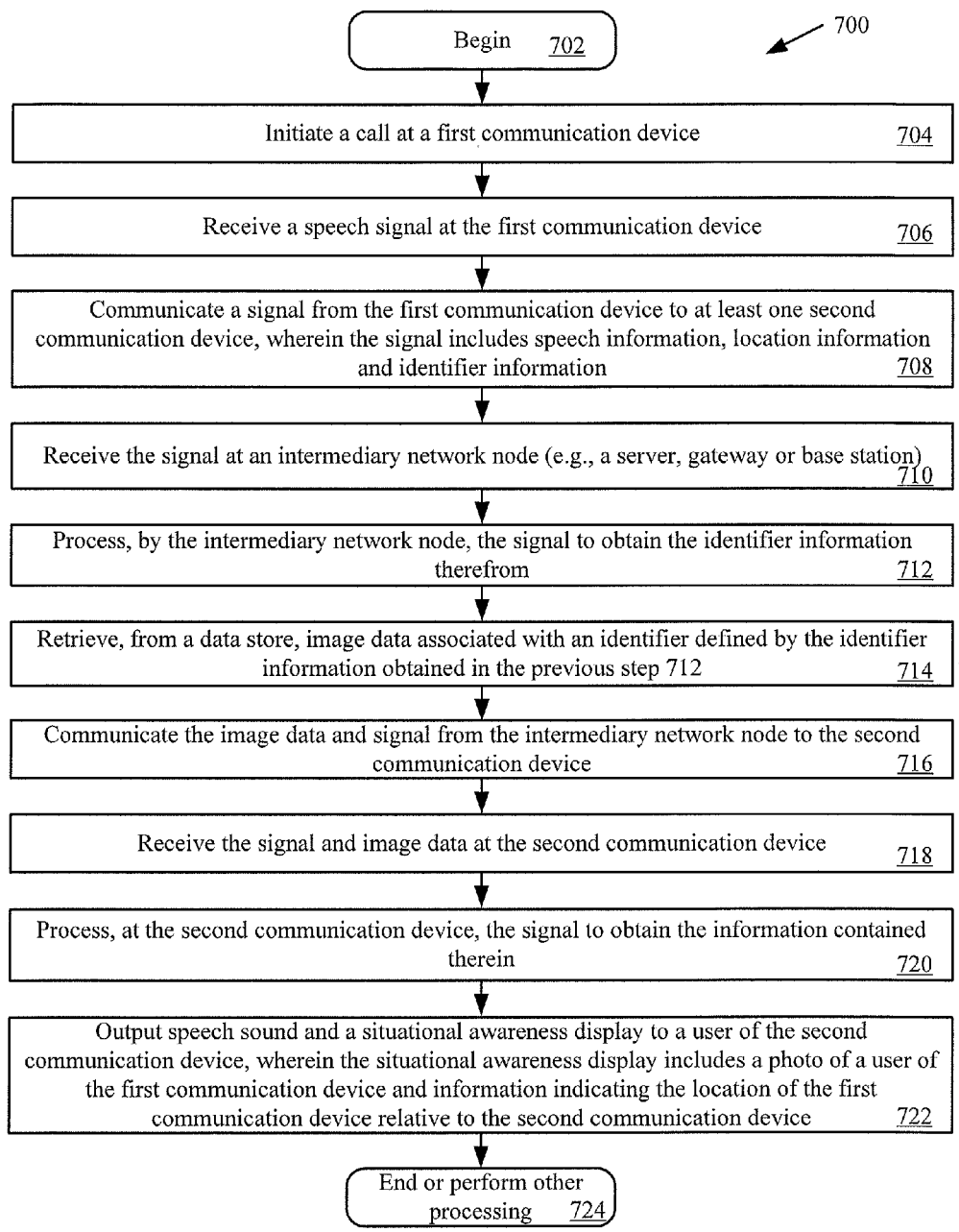
FIG. 7 is a flow diagram of a second exemplary method that is useful for understanding the present invention.

Referring now to FIG. 7, there is provided a flow diagram of a method 700 for providing situational awareness to a user of an electronic device (e.g., a communication device). As shown in FIG. 7, the method begins with step 702 and continues with step 704. In step 704, a call is initiated at a first communication device (e.g., communication device 106 of FIG. 1). The call can be initiated by depressing a PTT button of the communication device. Thereafter, a user of the first communication device speaks into a microphone thereof. In effect, a speech signal is received at the first communication device in step 706. Next, step 708 is performed where a signal is communicated from the first communication device to at least one second communication device (e.g., communication device 102, 108, 112 and/or 116 of FIG. 1). The signal includes, but is not limited to, speech information, location information and identifier information. In step 710, the signal is received at an intermediary network node (e.g., server 114 of FIG. 1, a gateway or a base station).

At the intermediary network node, steps 712-716 are performed. Step 712 involves processing the received signal to obtain the information contained therein. Subsequently, image data is retrieved from a data store (e.g., a database) in step 714. The image data can be stored in the data store in association with an identifier (e.g., a communication device identifier). As such, the image data can be retrieved from the data store using the identifier information obtained from the received signal. After retrieving the image data, the intermediary network node communicates the received signal and image data to the second communication device, as shown by step 716. In a next step 718, the signal and image data are received at the second communication device.

At the second communication device, steps 720 and 722 are performed. In step 720, the signal is process to obtain the information contained therein. Upon completing step 720, step 722 is performed where speech sound is output to a user of the second communication device via a speaker. Alternatively, the speech can be converted to text. In this scenario, the text is output to the user of the second communication device via a display screen. Step 722 also involves displaying a situational awareness display on the display screen of the second communication device. The situational awareness display includes an image of the user of the first communication device. The situational awareness display can also include information indicating the location of the first communication device relative to the second communication device. Exemplary situational awareness displays are described above in relation to FIGS. 4-5. Notably, the situational awareness display can be output prior to, subsequent to or concurrently with the speech sound (or alternatively converted speech text). Also, the situational awareness display can remain on the display screen until a next call begins. When the next call begins, the situational awareness display can be updated or removed from the display. If the situational awareness display is removed from the display, then a new situational awareness display can be presented to the user. The new situational awareness display can be of the same type or of a different type than the previously presented situational awareness display. Upon completing step 722, the method 700 continues with step 724. In step 724, the method 700 ends or other processing is performed.

As described above in relation to FIG. 6, the intermediary network node automatically performs actions to retrieve image data in response to the reception of a signal from a calling communication device. Embodiments of the present invention are not limited in this regard. For example, the intermediary node can perform actions to retrieve image data in response to the reception of a request for said image data from a called communication device. The called communication device can generate said request in response to the reception of a signal communicated from the calling communication device.

In light of the forgoing description of the invention, it should be recognized that the present invention can be realized in hardware, software, or a combination of hardware and software. A method for matching gain levels of transducers according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. A method for providing situational awareness to a first individual using a first electronic device, comprising:
   generating, by at least one electronic circuit, a situational awareness display concurrently comprising a first photo of a second individual using a second electronic device and information indicating a distance between said first electronic device and said second electronic device; and
   displaying the situational awareness display on a display screen of the first electronic device;
   wherein at least one of said first electronic device and said second electronic device is a mobile electronic device having a non-stationary location within a geographic area.

2. The method according to claim 1, wherein the situational awareness display is an electronic map or matrix of images.

3. The method according to claim 1, wherein the situational awareness display is generated concurrently with the start of a call.

4. The method according to claim 1, further comprising highlighting or marking the first photo in response to the reception of a transmission from the second electronic device.

5. The method according to claim 1, further comprising changing a size of the first photo in response to the reception of a transmission from the second electronic device.

6. The method according claim 1, further comprising retrieving image data defining the first photo from a data store in response to a call transmission received on a channel associated with a particular talkgroup.

7. The method according claim 1, further comprising retrieving image data defining the first photo from a data store based on a source unit identifier, a destination unit identifier and/or a destination talkgroup identifier contained in a received transmission.

8. The method according to claim 1, further comprising updating the situational awareness display to include at least one second photo of a third individual using a third electronic device that has recently joined an active call.

9. The method according to claim 1, further comprising updating the situational awareness display to remove the first photo therefrom when an active call is terminated or a new call begins.

10. The method according to claim 1, further comprising generating a call report including call information and an image of at least one individual who participated in a call identified by the call information.

11. A method for providing situational awareness to an individual using an electronic device, comprising:
    receiving, at a first electronic device, a transmission for establishing a communications link between the first electronic device and a second electronic device;
    in response to the reception of the transmission, concurrently displaying on a display screen of the first electronic device a first photo of an individual using the second electronic device and information indicating a location of the first electronic device relative to the second electronic device.

12. The method according to claim 11, wherein the first photo is displayed within a geographic map or a matrix of images.

13. The method according to claim 12, wherein the first photo is located a distance from a reference point within the geographic map so as to show a location of the second electronic device within a geographic area relative to a location of the first electronic device within the geographic area.

14. The method according to claim 11, further comprising displaying on the display screen a second photo of an individual using a third electronic device which is currently logged into a talkgroup to which at least one of the first electronic device and the second electronic device belong.

15. The method according to claim 11, further comprising displaying on the display screen an indicator when the individual using the second electronic device is speaking during an active call.

16. The method according to claim 15, further comprising removing the indicator from the display screen when the individual using the second electronic device is not speaking during the active call.

17. The method according to claim 11, further comprising changing the size of the first photo in response to a reception of a call transmission from the second electronic device.

18. A system, comprising:
    at least one electronic circuit configured to
       generate a situational awareness display concurrently comprising a first photo of a first individual using a first electronic device and information indicating a distance between said first electronic device and said second electronic device, and
       present the situational awareness display to a second individual using the second electronic device;
    wherein at least one of said first electronic device and said second electronic device is a mobile electronic device having a non-stationary location within a geographic area.

19. The system according to claim 18, wherein the situational awareness display is a geographical map or a matrix of images.

20. The system according to claim 18, wherein the situational awareness display is generated concurrently with the start of a call.

21. The system according to claim 18, wherein the electronic circuit is further configured for highlighting or marking the first photo in response to a reception of a call transmission from the first electronic device.

22. The system according to claim 18, wherein the electronic circuit is further configured for changing a size of the first photo in response to a reception of a call transmission from the first electronic device.

23. The system according to claim 18, wherein the electronic circuit is further configured for retrieving image data defining the first photo from a data store in response to a call transmission received on a channel associated with a particular talkgroup.

24. The system according to claim 18, wherein the electronic circuit is further configured for retrieving image data defining the first photo from a data store based on a source unit identifier, a destination unit identifier and/or a destination talkgroup identifier contained in a received call transmission.

25. The system according to claim 18, wherein the electronic circuit is further configured for updating the situational awareness display to include at least one second photo of a third individual using a third electronic device that has recently joined an active call.

26. The system according to claim 18, wherein the electronic circuit is further configured for updating the situational awareness display to remove the first photo therefrom when an active call is terminated or a new call begins.

27. The system according to claim 18, wherein the electronic circuit is further configured for generating a call report including call information and an image of at least one individual who participated in a call identified by the call information.

28. A system, comprising:
at least one electronic circuit configured to
receive a transmission for establishing a communications link between a first electronic device and a second electronic device;
in response to the reception of the transmission, concurrently display on a display screen of the first electronic device a first photo of an individual using the second electronic device and information indicating a location of the first electronic device relative to the second electronic device.

29. The system according to claim 28, wherein the first photo is displayed within a geographic map or a matrix of images.

30. The system according to claim 29, wherein the first photo is located a distance from a reference point within the geographic map so as to show a location of the second electronic device within a geographic area relative to a location of the first electronic device within the geographic area.

31. The system according to claim 28, wherein the electronic circuit is further configured for displaying on the display screen a second photo of an individual using a third electronic device which is currently logged into a talkgroup to which at least one of the first electronic device and the second electronic device belong.

32. The system according to claim 28, wherein the electronic circuit is further configured for displaying on the display screen an indicator when the individual using the second electronic device is speaking during an active call.

33. The system according to claim 32, wherein the electronic circuit is further configured for removing the indicator from the display screen when the individual using the second electronic device has stopped speaking during the active call.

34. The system according to claim 28, further comprising changing the size of the first photo in response to a reception of a call transmission from the second electronic device.

* * * * *